United States Patent
Tsai et al.

(10) Patent No.: US 10,474,837 B2
(45) Date of Patent: Nov. 12, 2019

(54) ACCESS CONTROL FOR BUSINESS PROCESS DATA

(71) Applicant: Open Text Corporation, Waterloo (CA)

(72) Inventors: Kenwood Tsai, Palo Alto, CA (US); Harish Rawat, San Jose, CA (US); Xiaoting Tang, Pleasanton, CA (US); Payam Shahidi, San Jose, CA (US)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 15/982,782

(22) Filed: May 17, 2018

(65) Prior Publication Data

US 2018/0293404 A1    Oct. 11, 2018

Related U.S. Application Data (63) Continuation of application No. 13/302,913, filed on Nov. 22, 2011, which is a continuation of application No. 11/644,340, filed on Dec. 22, 2006, now Pat. No. 8,086,637.

(51) Int. Cl.
*G06F 16/30* (2019.01)
*G06F 21/62* (2013.01)

(52) U.S. Cl.
CPC ....... *G06F 21/6245* (2013.01); *Y10S 707/944* (2013.01); *Y10S 707/955* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 5,226,161 A | 7/1993 | Khoyi et al. |
| 5,708,812 A | 1/1998 | Van Dyke |
| 5,764,972 A | 6/1998 | Crouse et al. |
| 5,765,153 A | 6/1998 | Benantar et al. |
| 5,805,118 A | 9/1998 | Mishra et al. |
| 5,845,299 A | 12/1998 | Arora et al. |
| 5,899,996 A | 5/1999 | Dysart et al. |
| 5,900,871 A | 5/1999 | Atkin et al. |
| 5,907,326 A | 5/1999 | Atkin et al. |

(Continued)

FOREIGN PATENT DOCUMENTS

| | | |
|---|---|---|
| WO | WO 2000/029927 A2 | 5/2000 |
| WO | WO 2000/034873 A1 | 6/2000 |
| WO | WO 2003/025796 A1 | 3/2003 |

OTHER PUBLICATIONS

Office Action for U.S. Appl. No. 11/644,340, dated May 19, 2010, 16 pgs.

(Continued)

*Primary Examiner* — Mahesh H Dwivedi
(74) *Attorney, Agent, or Firm* — Sprinkle IP Law Group (57) ABSTRACT

Controlling access to business process data is disclosed. An instance of a first business process object configured to contain business process data of a business process is created. An instance of a second business process object configured to contain business process data of the business process is created. A first access control list is associated with the instance of the first business process object and a second access control list is associated with the instance of the second business process object.

20 Claims, 4 Drawing Sheets

(56) References Cited

U.S. PATENT DOCUMENTS

| | | | |
|---|---|---|---|
| 5,918,013 A | 6/1999 | Mighdoll et al. | |
| 5,950,198 A | 9/1999 | Falls et al. | |
| 5,987,498 A | 11/1999 | Athing et al. | |
| 6,026,433 A | 2/2000 | D'arlach et al. | |
| 6,044,374 A | 3/2000 | Nesamoney et al. | |
| 6,058,366 A | 5/2000 | Tarkiainen et al. | |
| 6,119,130 A | 9/2000 | Nguyen et al. | |
| 6,135,646 A | 10/2000 | Kahn | |
| 6,148,311 A | 11/2000 | Wishnie et al. | |
| 6,163,880 A | 12/2000 | Ramalingam et al. | |
| 6,199,077 B1 | 3/2001 | Inala et al. | |
| 6,202,066 B1 | 3/2001 | Barkley et al. | |
| 6,236,971 B1 | 5/2001 | Stefik et al. | |
| 6,236,996 B1 | 5/2001 | Bapat et al. | |
| 6,292,798 B1 | 9/2001 | Dockter et al. | |
| 6,327,628 B1 | 12/2001 | Anuff et al. | |
| 6,338,086 B1 | 1/2002 | Curtis et al. | |
| 6,345,329 B1 | 2/2002 | Baskey et al. | |
| 6,351,741 B1 | 2/2002 | Flenniken | |
| 6,353,851 B1 | 3/2002 | Anupam et al. | |
| 6,389,540 B1 | 5/2002 | Scheifler et al. | |
| 6,453,310 B1 | 9/2002 | Zander | |
| 6,463,535 B1 | 10/2002 | Drews | |
| 6,466,983 B1 | 10/2002 | Strazza | |
| 6,546,397 B1 | 4/2003 | Rempell | |
| 6,560,639 B1 | 5/2003 | Dan et al. | |
| 6,625,603 B1 | 9/2003 | Garg | |
| 6,643,661 B2 | 11/2003 | Polizzi et al. | |
| 6,654,749 B1 | 11/2003 | Nashed | |
| 6,668,353 B1 | 12/2003 | Yurkovic | |
| 6,714,936 B1 | 3/2004 | Nevin | |
| 6,745,238 B1 | 6/2004 | Giljum et al. | |
| 6,772,146 B2 | 8/2004 | Khemlani et al. | |
| 6,788,933 B2 | 9/2004 | Boehmke et al. | |
| 6,931,546 B1 | 8/2005 | Kouznetsov et al. | |
| 6,950,943 B1 | 9/2005 | Bacha et al. | |
| 7,035,825 B1 | 4/2006 | Sturtevant et al. | |
| 7,293,070 B2 | 11/2007 | Moses et al. | |
| 7,340,406 B1 | 3/2008 | Tribble | |
| 7,350,231 B2 | 3/2008 | Madison et al. | |
| 7,430,587 B2 | 9/2008 | Malone | |
| 7,689,532 B1 | 3/2010 | Levy | |
| 7,801,990 B2 | 9/2010 | Anuff et al. | |
| 7,984,066 B1* | 7/2011 | Kilday | G06F 21/6218 707/781 |
| 8,086,637 B1 | 12/2011 | Tsai et al. | |
| 8,407,353 B2 | 3/2013 | Moses et al. | |
| 8,606,916 B2 | 12/2013 | Moses et al. | |
| 9,027,144 B1* | 5/2015 | Roustant | G06F 9/542 726/26 |
| 9,037,739 B2 | 5/2015 | Moses et al. | |
| 9,521,046 B2 | 12/2016 | Anuff et al. | |
| 9,716,751 B2 | 7/2017 | Moses et al. | |
| 9,749,411 B2 | 8/2017 | Moses et al. | |
| 2002/0002543 A1 | 1/2002 | Spooren et al. | |
| 2002/0023147 A1 | 2/2002 | Kovacs et al. | |
| 2002/0026359 A1 | 2/2002 | Long et al. | |
| 2002/0029296 A1 | 3/2002 | Anuff et al. | |
| 2002/0067370 A1 | 6/2002 | Forney et al. | |
| 2002/0072920 A1 | 6/2002 | Grianger | |
| 2002/0078168 A1 | 6/2002 | Christfort et al. | |
| 2002/0078377 A1 | 6/2002 | Chang et al. | |
| 2002/0083415 A1 | 6/2002 | Jazdzewski | |
| 2002/0107768 A1 | 8/2002 | Davis | |
| 2002/0156756 A1 | 10/2002 | Stanley et al. | |
| 2002/0158899 A1 | 10/2002 | Raymond | |
| 2002/0178439 A1 | 11/2002 | Rich et al. | |
| 2002/0184165 A1 | 12/2002 | Deboer et al. | |
| 2002/0194267 A1 | 12/2002 | Flesner et al. | |
| 2002/0194347 A1 | 12/2002 | Koo et al. | |
| 2002/0199123 A1 | 12/2002 | Mcintyre et al. | |
| 2003/0018964 A1 | 1/2003 | Fox et al. | |
| 2003/0028610 A1 | 2/2003 | Pearson | |
| 2003/0034905 A1 | 2/2003 | Anton et al. | |
| 2003/0041198 A1 | 2/2003 | Exton et al. | |
| 2003/0046589 A1 | 3/2003 | Gregg et al. | |
| 2003/0163438 A1 | 8/2003 | Barnett et al. | |
| 2003/0182656 A1 | 9/2003 | Leathers et al. | |
| 2003/0187966 A1 | 10/2003 | Sinha | |
| 2003/0192031 A1 | 10/2003 | Srinivasan et al. | |
| 2003/0195789 A1 | 10/2003 | Yen | |
| 2004/0015391 A1 | 1/2004 | Dupreez et al. | |
| 2004/0162901 A1 | 8/2004 | Mangipudi et al. | |
| 2004/0167984 A1 | 8/2004 | Herrmann | |
| 2004/0205042 A1 | 10/2004 | Ritter et al. | |
| 2004/0220897 A1 | 11/2004 | Bernhart et al. | |
| 2004/0243640 A1 | 12/2004 | Bostleman et al. | |
| 2005/0004978 A1 | 1/2005 | Reed et al. | |
| 2005/0039033 A1 | 2/2005 | Meyers et al. | |
| 2005/0044396 A1 | 2/2005 | Vogel et al. | |
| 2005/0114661 A1* | 5/2005 | Cheng | G06F 21/6218 713/167 |
| 2005/0171833 A1 | 8/2005 | Jost et al. | |
| 2005/0182963 A1 | 8/2005 | Phillips et al. | |
| 2005/0223009 A1 | 10/2005 | Powers et al. | |
| 2005/0289166 A1 | 12/2005 | Stanley et al. | |
| 2006/0026558 A1 | 2/2006 | Beringer et al. | |
| 2006/0174334 A1 | 8/2006 | Perlin et al. | |
| 2006/0195494 A1 | 8/2006 | Deitrich | |
| 2007/0156418 A1 | 7/2007 | Richter et al. | |
| 2011/0302211 A1 | 12/2011 | Kilday et al. | |
| 2012/0072461 A1 | 3/2012 | Tsai et al. | |
| 2017/0090399 A1 | 3/2017 | Anuff et al. | |
| 2018/0336520 A1* | 11/2018 | Davis | G06Q 10/101 |

OTHER PUBLICATIONS

Office Action for U.S. Appl. No. 11/644,340, dated Oct. 29, 2010, 19 pgs.

Office Action for U.S. Appl. No. 11/644,340, dated Feb. 10, 2011, 27 pgs.

Office Action for U.S. Appl. No. 11/644,340, dated Jun. 17, 2011, 34 pgs.

EMC Corporation, Content Server Administrator's Guide, EMC² documentum, Version 5.3 SP1, Sep. 2005, 654 pgs.

EMC Corporation, Content Server Fundamentals, EMC² documentum, Version 5.3 SP1, Sep. 2005, 354 pgs.

U.S. Appl. No. 11/227,254, filed Sep. 16, 2005, 43 pgs.

U.S. Appl. No. 60/626,096, filed Nov. 8, 2004, part 1, 144 pgs.

U.S. Appl. No. 60/626,096, filed Nov. 8, 2004, part 2, 69 pgs.

Office Action for U.S. Appl. No. 13/302,913, dated Apr. 16, 2013, 65 pgs.

Silver, Bruce, EMC Documentum BPM: Breaking New Ground with Collaboration, Content Awareness, Mar. 2005, 20 pgs.

Fordin, Scott, Documentum FAQ: Common Questions and Concerns About Documentum at NEF, Rev. 1.0, Dec. 2006, 9 pgs.

Salamone, Salvatore, "EMC releases Documentum 5.3," Techworld, Apr. 5, 2005, 1 pg.

Panjwani, Sunil, et al, "Business Process Services: Technical Overview and Lab," Documentum Developer Conf., San Ramon, CA, Oct. 2004, 16 pgs.

2006 BPMS Report Series, BPM Institute, Oct. 13, 2005, 1 pg., retrieved from http://web.archive.org/web/20061013185230/https://www.bpminstitute.org/bpmsreport.html.

Bizflow User Guide, Version 9.0, Handysoft Global Corp., Copyright 2004, 363 pgs.

Silver, Bruce, "Documentum BPM: Automating and Integrating Content-Centric Processes," May 2004, 15 pgs.

Silver, Bruce, The 2006 BPMS Report: IBM WebSphere BPM Suite, v6.0, Mar. 2005, 30 pgs.

Office Action for U.S. Appl. No. 13/302,913, dated Oct. 17, 2013, 32 pgs.

Fortin, Frederic, Inherence by type and "New Document action", EMC, May 24, 2005, 5 pgs. retrieved from https://community.emc.com/thread/61515?start=0&start=0 and printed on Aug. 20, 2013.

Office Action for U.S. Appl. No. 13/302,913, dated Jun. 23, 2014, 45 pgs.

Office Action for U.S. Appl. No. 13/302,913, dated Oct. 15, 2014, 43 pgs.

(56) References Cited

OTHER PUBLICATIONS

Appellant's Brief for U.S. Appl. No. 13/302,913, mailed Apr. 20, 2015, 42 pgs.
Resubmitted Appellant's Brief for U.S. Appl. No. 13/302,913, mailed Jul. 2, 2015, 9 pgs.
Examiner's Answer for U.S. Appl. No. 13/302,913, dated Nov. 4, 2015, 40 pgs.
Definition of "Repository," American Heritage College Dictionary, 4th Edition, 2 pgs.
Reply Brief for U.S. Appl. No. 13/302,913, mailed Jan. 4, 2016, 6 pgs.
Decision on Appeal for U.S. Appl. No. 13/302,913 mailed Mar. 19, 2018, 11 pgs.
Bruno, et al., "Pebble: A Component-Based Operating System for Embedded Applications," Proceedings of USENIX Workshop on Embedded Systems, Cambridge, MA, Mar. 29-31, 1999, 11 pgs.
"Iplanet Portal Server 3.0 Overall Architecture" (White Paper); iPlanet e-Commerce Solutions (A Sun/Netscape Alliance), 2000, 28 pgs.
"Solving Real World Business Challenges: DataChannel Enterprise Information Portal Architecture" (Technical White Paper); DataChannel, Inc., 2000, 9 pgs.
"Outlook 2000—Sharing Outlook Components," Microsoft Office 2000—Online Training, 5 pgs.
"Air Products Gets to Market Faster with Microsoft SharePoint Portal Server," Microsoft SharePoint Portal Server 2001, Published Jun. 2001, 5 pgs.
"Portal and Knowledge Management Roadmap," Portal & Knowledge Management Session Code: KB011SN; CA Computer Associates; CA World, 33 pgs.
"Getting Started with WAR Files," IONA Technologies PLC, IONA/Portal Suite/iPortal Application Server, Mar. 6, 2002, pp. 1-7.
"NT-to-Win2K Migration Tools," Sep. 2000, Windows 2000 Magazine, Mar. 6, 2002, pp. 1-15.
"Web Browser File Uploading to EAServer," Greg Douglas, Sybase Principle Consultant, Jan. 15, 2001, pp. 1-5.
"Developing Applications with Jrun," Allaire Corp., pp. 1 to xxvi, 1-13, 378-413, May 10, 2001.
"Developing Web Applications with ColdFusion," Allaire Corp., pp. 1 to xiii, 219-230, 1999.
The Delphi Group, "Corporate Portal Architecture: Special Report on Infoimage Freedom," pp. 1-20, Nov. 1999.
Grosso, P., "XML Fragment interchange, W3C," www.w3.org/TR/xml-fragment, pp. 1-31, Feb. 12, 2001.
Lie, H.K. et al., "Cascading Style Sheets, Level L," W3C, www.w3.org/pub/www.TR/REC-CSS1-961217, Dec. 17, 1996, pp. 1-86.
Courter, G. et al., "Mastering Microsoft Office 2000 Professional Edition," 1999, pp. 1-537.
"Computerworld Companies Turn to Portals for Electronic Business," News Story by: Julia King.
"Computerworld Epicentric Opens Doors to E-Commerce," News and Story by Amy Helen Johnson.
Citrix Delphi Group Names Sequoia's XML Portal Server Leading Application for Creating E-Business Portals.
Citrix Sequoia Software Announces New Java-Based Portal Server, XPS for Unix.
Vignette Corporation, Vignette Application Portal, Dec. 2002, pp. 1-17.
Montalbano, "Epicentric Buys Web-Services Tool Company," Mar. 2, 2001, CRN, San Francisco, CA, 3 pgs.
Epicentric Foundation Server Wins "2001 Product of the Year" award from CMP Media's Transform Magazine, Jan. 7, 2002, 4 pgs.
Epicentric, Inc., Tech Note—Configuring LDAP with Netscape Directory Server 4.1 for Epicentric Foundation Server 3.5—JNDI Full Mode, Mar. 15, 2001, San Francisco, CA.
Emmerich et al., "Implementing Incremental Code Migration with XML," ACM, pp. 397-406, ICSE 2000.
Schrefl et al., "Self-Maintaining Web Pages—Overview," pp. 83-90, IEEE 2001.
Padmanabhan et al., "The Content and Access Dynamics of a Busy Web Site: Findings and Implications," pp. 111-123, ACM 2000.
DataChannel, Looking Under the Hood: DataChannel Server's Intelligent eXtensible Architecture (IXA), DataChannel Server 4.0, pp. 1-12, 2000.
Choi, Byron, "A Few Tips for Good XML Design," pp. 1-16, Nov. 14, 2000, Philadelphia, PA.
Challenger et al., "A Publishing System for Efficiently Creating Dynamic Web Content," pp. 844-853, IEEE 2000; IEEEINFOCOM 2000.
Iyengar et al., "High Performance Web Site Design Techniques," IEEE Internet Computing, pp. 17-26, Mar.-Apr. 2000; http://computer.org/internet/.
Challenger et al., "A Scalable and Highly Available System for Serving Dynamic Data at Frequently Accessed Web Sites," pp. 1-30, 1998, http://gallifrey.watson.ibm.com/sc98.
Reference (computer science), Wikipedia, Sep. 6, 2010, 5 pgs., at http://en.wikipedia.org/wiki/Reference_(computer_science), printed Feb. 17, 2011.
Identity (object-oriented programing), Wikipedia, Nov. 8, 2010, 2 pgs., at http://en.wikipedia.org/wiki/Identity_(object-oriented_programming), printed Feb. 17, 2011.

\* cited by examiner

ACCESS CONTROL FOR BUSINESS PROCESS DATA

CROSS REFERENCE TO OTHER APPLICATIONS

This application is a continuation of U.S. patent application Ser. No. 13/302,913 filed Nov. 22, 2011, entitled ACCESS CONTROL FOR BUSINESS PROCESS DATA, which is a continuation of U.S. patent application Ser. No. 11/644,340 filed Dec. 22, 2006, entitled ACCESS CONTROL FOR BUSINESS PROCESS issued as U.S. Pat. No. 8,086,637, which are incorporated herein by reference for all purposes.

BACKGROUND OF THE INVENTION

Business Process Management (bpm) software allows businesses to automate their work flow. For example, the steps for requesting a vacation can be captured in a flow that runs on a business process computer system which takes a vacation request as input, calculates if the requested vacation time is available, routes it to the proper approving manager, and, once approved, notifies all relevant associated personnel and posts it on a group calendar. During the execution of the business process, a number of business objects may be created and stored in the computer system to store relevant business process data. In some cases, the different users that interact with the business process will control or have access to the entire process and all of the process's associated data. However, the data involved or associated with a given business processes may have different access requirements depending on the data's nature. For example, in a loan mortgage approval process, an appraiser should not be able to access all of the applicant's financial information despite being able to input the appraisal as part of the business process. It would be beneficial to have access to different business objects associated with a business process be able to be controlled individually for each business object.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Controlling access to business process data is disclosed. During the development of a business process, one or more business process objects that can hold business process data are specified. Each business process object is associated with a potentially different access control list (ACL). When an instance of the business process is created, e.g., upon submission of a vacation request by employee X for dates Y to Z, in the example described above, instances of the one or more business process objects are created and stored in a repository. For each such business process object instance, the corresponding access control list associated with that business process object at business process design time is associated with the business process object instance. Access to each instance of the one or more business process objects is controlled by the access control list that was associated with the business process object instance at the time the business process object instance was created. The access control list indicates a type of access that an application, a user, or a group of users is allowed.

Two different business processes can have associated with it the same type of business process object as another business process. However, each of the two different business processes can associate a potentially different access control list with said business process object, even though said business process object is of the same type for the two different business processes. For example, a vacation request business process may have associated with it an "employee" type of business object, and a purchase order request business process can have a business object of same type "employee" associated with it. In some embodiments, a different ACL may be associated, e.g., at business process design time, with the employee type object in the context of a vacation request than in the context of a purchase order request. For example, a purchasing department worker may be given "read" access to employee objects associated with a purchase order business process instance, but denied access to the same type of object created in the context of a vacation request business process instance. In some embodiments, business process objects associated with one or more business processes are stored in a repository comprising and/or associated with a content management system, and the repository and/or associated content management system manages the function of associating a business process object instance created by an instance of a business process an ACL associated with the business process object at the time the business process was defined (or some other time prior to instantiation of the current business process instance). In some embodiments, the repository and/or associated content management system controls access to the business process object instance, in accordance with the ACL.

Figure 1:
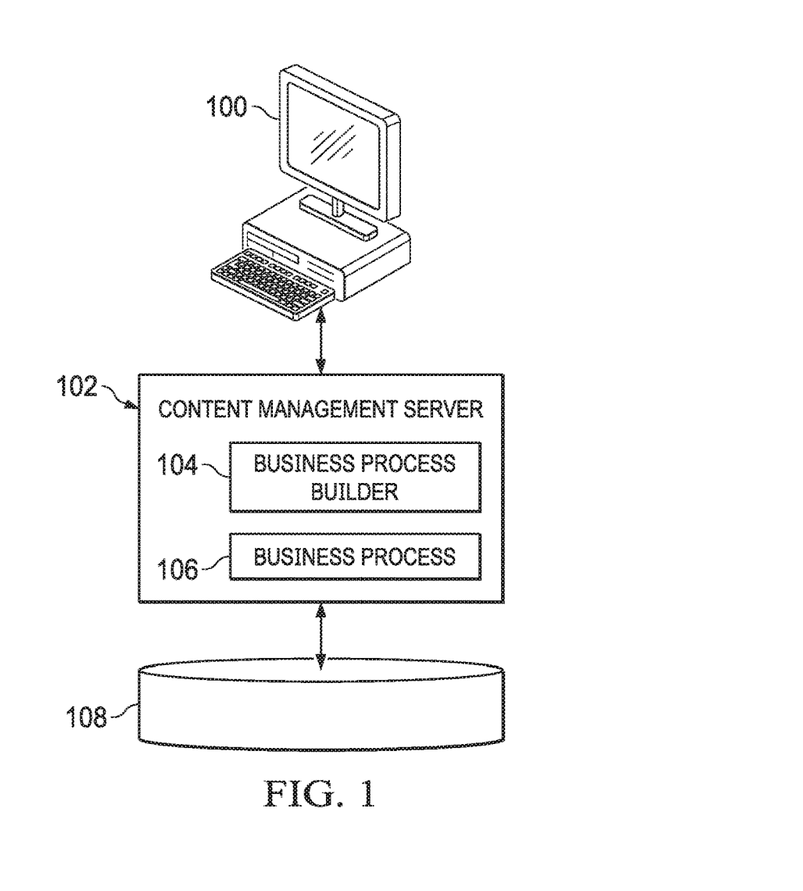
FIG. 1 is a block diagram illustrating an embodiment of a system for controlling access to business process data.

FIG. 1 is a block diagram illustrating an embodiment of a system for controlling access to business process data. In the example shown, a user using computer 100 accesses content management system 102. Content management server 102 includes business process builder 104 which can be used by a developer to create business process 106. When developing business process 106, developer indicates access control associated with any business process object that is used by business process 106. Business process 106, when executed, creates an instance of business process object(s) that are stored in repository 108. In some embodiments, the instance may be a copy of an existing object stored in the repository 108, e.g., a copy of an existing employee object of employee X in the vacation request example given above. In some embodiments, the instance may be created based on an object class or type stored in and/or otherwise associated with repository 108. Repository 108 controls access to the stored instance of any business process object based on the associated access control as specified by the developer to be associated with the business process object.

Figure 2:
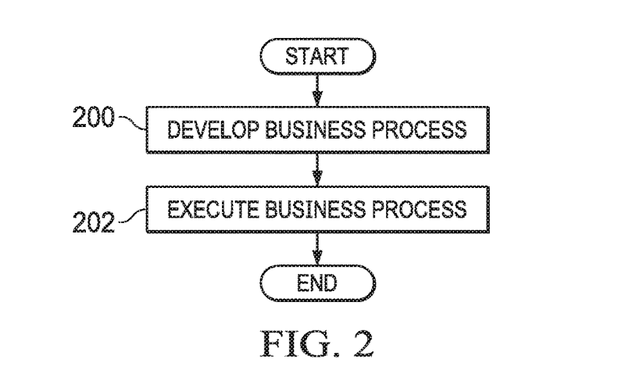
FIG. 2 is a flow diagram illustrating a process for creating and running a business process.

FIG. 2 is a flow diagram illustrating a process for creating and running a business process. In some embodiments, the process of FIG. 2 is executed in content management server 102. In the example shown, in 200 a business process is developed. A developer using an application running as part of a content management system develops a business process. A business process includes a defined number of steps that manipulate data that is stored in a business process object. The data may either by entered by end users interacting with the system manually or can be received from other applications. For example, a process to create a purchase order includes entering customer information, entering purchase order details of what is being purchased by the customer, and entering the employee information that is creating the purchase order. In this case, the process has a number of steps that require entering data that is stored as a customer information object, a purchase order object, and an employee information object. Or for example, a process to create a vacation request includes entering desired vacation information and entering the employee information that is requesting the vacation. In this second case, the process also has a number of steps that require entering data that is stored. The data being a desired vacation information object and an employee information object.

In 202, the business process is executed. An instance of the business process is created and run. The instance of the business process creates a set associated business process objects that hold data.

Figure 3:
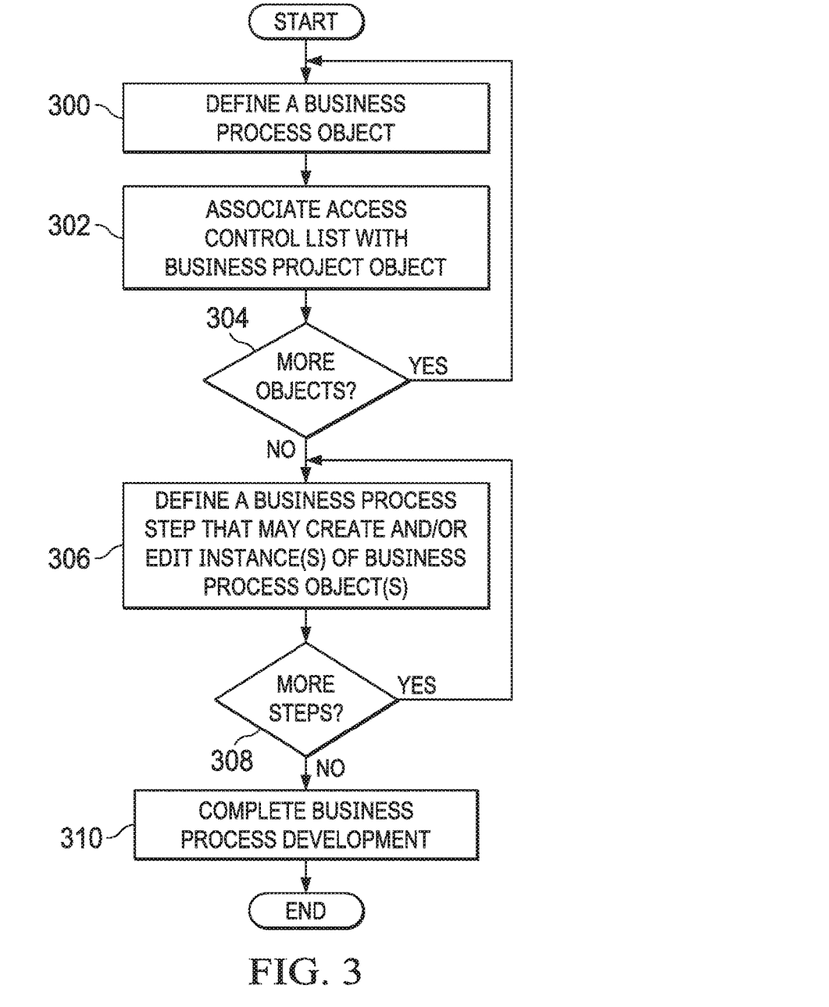
FIG. 3 is a flow diagram illustrating an embodiment of a process for developing a business process.

FIG. 3 is a flow diagram illustrating an embodiment of a process for developing a business process. In some embodiments, the process of FIG. 3 is used to implement 200 of FIG. 2. In the example shown, in 300 a business process object is defined. The business process object holds data for a business process where the steps of the business process may read, write, edit, or delete data associated with the business process object. In 302, an access control list is associated with the business process object. The access control list indicates a type of access that an application, a user, or a group will be allowed to have to the business process object. Access can be specified as a permission or restriction including one or more of the following: none, browse, read, relate (e.g., link to other objects), version, write, change location, change owner, change state, change permission, delete, execute, annotate, approve, or any other appropriate access to the business process object. The ACL can also specify a permission or a restriction for an application, a user, or a group of users. The ACL can also specify that the accessing party is required to be a specific application, a specific user, or a specific group of users. Similarly, access can also be restricted if the accessing party is a specific application, a specific user, or a specific group of users. In 304, it is determined if there are more objects. If there are, control passes to 300 where a next business process object is defined. If there are not, control passes to 306.

In 306, a business process step is defined that may edit one or more instances of one or more business process objects. For example, a new DSL Service Business process includes steps to: 1) submit DSL service form; 2) assign work order to DSL technician (manual step); 3) wait for 10 business days for any complaints; 4) charge credit card; and 5) end business process. The DSL service form step of the business process includes entering customer information into a customer business process object, credit card information into a credit card business process object, and order details into an order details business process object. Each of these objects has different access control lists associated with them (as indicated during the development process). For example, the customer business process object may be read and written by a customer service representative, but only read by an installation technician; the credit card business process object may be read and written by a customer service representative, but no access is available for an installation technician; and, the order details business process object may be read and written by a customer service representative, and also read and written by an installation technician. In 308, it is determined if there are more steps. If there are, then control passes to 306. If not, then in 310 the business process development is completed. Completion includes building a business process or saving the business process.

Figure 4:
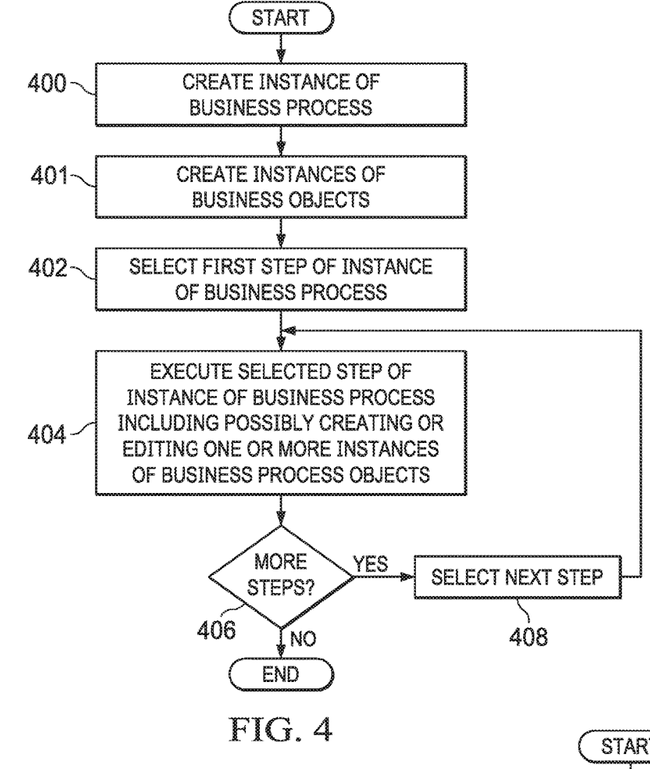
FIG. 4 is a flow diagram illustrating an embodiment of a process for executing a business process.

FIG. 4 is a flow diagram illustrating an embodiment of a process for executing a business process. In some embodiments, the process of FIG. 4 is used to implement 202 of FIG. 2. In the example shown, in 400 an instance of the business process is created. In 401 instances of business objects are created. In 402, the first step of the instance of the business process is selected. In 404, the selected step of the instance of the business process is executed including possibly editing one or more instances of business objects. In 406, it is determined if there are more steps. If so, in 408 a next step is selected and control passes to 404. If not, then the process ends.

Figure 5:
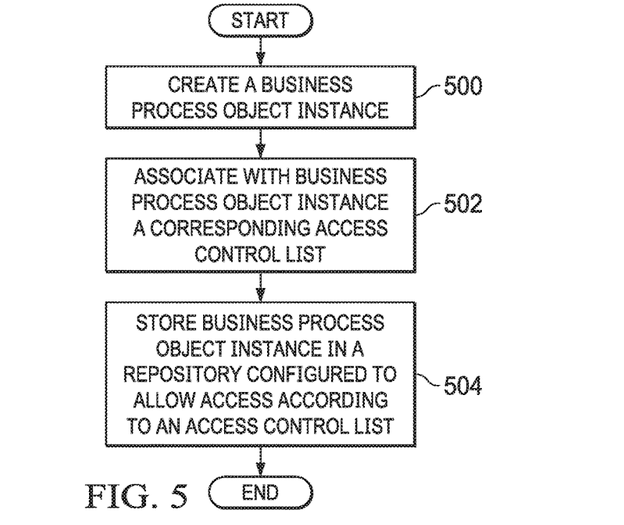
FIG. 5 is a flow diagram illustrating an embodiment of a process for creating and storing a business process object instance.

FIG. 5 is a flow diagram illustrating an embodiment of a process for creating and storing a business process object instance. In some embodiments, the process of FIG. 5 is used as part of 404 of FIG. 4. In the example shown, in 500 a business object instance is created. In 502, a corresponding access control list is associated with the business process object instance. In some embodiments, the ACL that is associated at 502 with the business process object instance comprises an ACL that was associated at business process design time, or some other time prior to instantiation at 500 of the business process object instance, with the business process object (i.e., the type or class of business object) in the context of the business process an instance of which created the business process object instance. In 504, the business process object instance is stored in a repository configured to allow access according to an access control list. When the business process object instance is accessed (or attempted to be accessed) by any application—for example, search, browsing, etc.—the repository allows or denies access based on the associated access control list.

Figure 6:
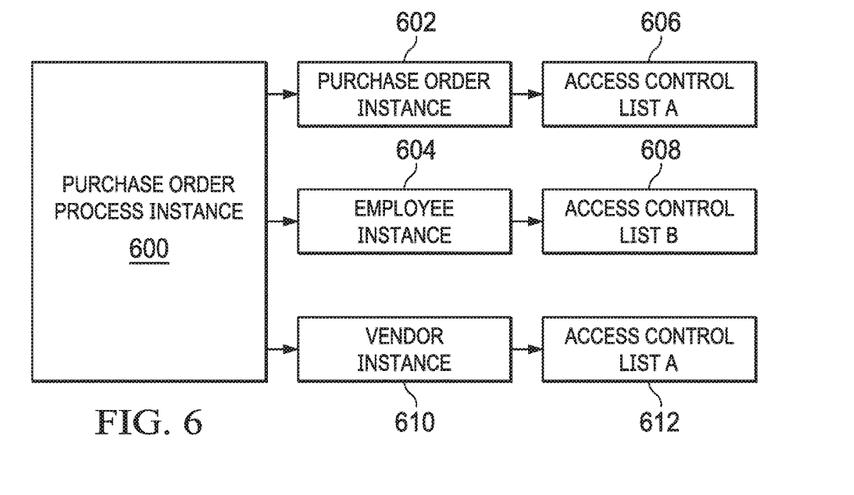
FIG. 6 is a block diagram illustrating an example of an embodiment of a business process instance and business process object instances.

FIG. 6 is a block diagram illustrating an example of an embodiment of a business process instance and business process object instances. In some embodiments, purchase order process instance 600 of FIG. 6 corresponds to a business process instance as created in 500 of FIG. 5, and purchase order instance 602 and access control list A 606 correspond to a business process object instance along with its corresponding access control list as referred to in 502 of FIG. 5. Similarly, employee instance 604 and customer instance 610 are instances of business process objects each with a corresponding access control list (608 and 612, respectively). In the example shown, purchase order process instance 600 is a business process instance that instantiates a purchase order process. The instance of the process creates associated business process objects (602, 604, and 610) and their associated access control lists (606, 608, and 612). Access control lists for the business process objects are selected based on the access appropriate for the data held in the instance of the business process object. For example, information regarding the purchase authorization level should be able to be edited by a human resource department; however, a requesting employee should not be able to change this field.

Purchase order instance 602 includes information regarding a purchase request—for example, the purchase request date, the requested item, the purchase order number, order date, receive date, paid date, etc. Associated access control list A 606 includes access information indicating read/write/edit access for requesting employee, an accounting department, an ordering department, and a shipping/receiving department so that they can each read, enter, and modify entries of the purchase order.

Employee instance 604 includes information regarding an employee that requested the purchase order—for example, employee name, employee identification number, purchase authority level, etc. Associated access control list B 608 includes access information indicating read access for the ordering and shipping/receiving department so the requestor can be contacted if there are questions regarding the order and read/write/edit/delete access for the human resource department so that the department can modify the employee information.

Vendor instance 610 includes information regarding the vendor from whom the requested purchase is to be made. Associated access control list A 612 has the same specified access as the access control list A 612 associated with purchase order instance 602.

Figure 7:
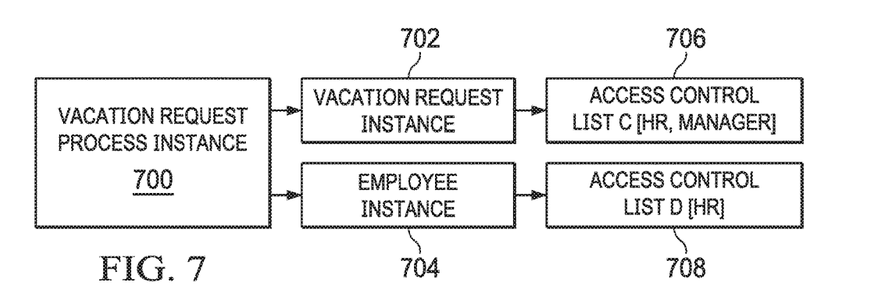
FIG. 7 is a block diagram illustrating an example of an embodiment of a business process instance and business process object instances.

FIG. 7 is a block diagram illustrating an example of an embodiment of a business process instance and business process object instances. In some embodiments, vacation request process instance 700 of FIG. 7 corresponds to a business process instance as created in 500 of FIG. 5, and vacation request instance 702 and access control list C 706 correspond to a business process object instance along with its corresponding access control list as referred to in 502 of FIG. 5. Similarly, employee instance 704 is an instance of a business process object with its corresponding access control list D 708. In the example shown, vacation request process instance 700 is a business process instance that instantiates a vacation request process. The instance of the process creates associated business process objects (702 and 704) and their associated access control lists (706 and 708). Access control lists for the business process objects are selected based on the access appropriate for the data held in the instance of the business process object. For example, information regarding the yearly vacation days accrued should be able to be edited by a human resource department; however, a requesting employee should not be able to change this field. Also, employee instance 704 can be the same type of business process object as employee instance 604. However, the two instances can have different associated access control lists, as in these examples employee instance 704 has access control list D 708 and employee instance 604 has access control list B 608.

Vacation request instance 702 includes information regarding a vacation request—for example, the requested dates, potential conflicts, etc. Associated access control list C 706 includes access information indicating read/write/edit access for the requesting employee and read access for the employee's manager and the human resources department.

Employee instance 704 includes information regarding an employee that requested the vacation—for example, employee name, employee identification number, vacation accrual level, etc. Associated access control list D 708 includes access information indicating read access for the employee so that the requestor can know their own vacation levels available and read/write/edit/delete access for the human resource department so that the department can modify the employee information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for controlling access to business process data, comprising:
   configuring a content management system ("CMS") to store:
      a first business process, the first business process comprising a definition of a first plurality of steps, the first plurality of steps comprising steps for editing instances of a first business process object and instances of a second business process object created by instances of the first business process;
      a second business process, the second business process including a definition of a second plurality of steps, the second plurality of steps comprising steps for editing instances of the first business process object and instances of a third business process object created by instances of the second business process;
      an association defined for the first business process between a first access control list ("ACL") and the first business process object wherein the first ACL specifies a specific application and a type of access that the specific application has to the first business process object;
      an association defined for the first business process between a second ACL and the second business process object, wherein the second ACL specifies the specific application and a type of access that the specific application has to the second business process object; and
an association defined for the second business process between a third ACL and the first business process object;
executing an instance of the first business process in the CMS;
creating, by the instance of the first business process, a first instance of the first business process object and an instance of the second business process object, the first instance of the first business process object and the instance of the second business process object configured to contain business process data of the instance of the first business process;
associating, by the instance of first business process, the first instance of the first business process object with the first ACL based on the association defined for the first business process between the first ACL and the first business process object;
associating, by the instance of first business process, the instance of the second business process object with the second ACL based on the association defined for the first business process between the second ACL and the second business process object;
executing an instance of the second business process;
creating, by the instance of the second business process, a second instance of the first business process object and an instance of the third business process object, the second instance of the first business process object and the instance of the third business process object configured to contain business process data of the instance of the second business process;
associating, by the instance of the second business process, the second instance of the first business process object with the third ACL based on the association defined for the second business process between the third ACL and the first business process object;
storing the first instance of the first business process object, the second instance of the first business process object, the instance of the second business process object and the instance of the third business process object in a CMS repository; and
using the CMS to control access to the first instance of the first business process object by the specific application in accordance with the first ACL, to control access to the second instance of the first business process object in accordance with the third ACL, and to control access to the instance of the second business process object by the specific application according to the second ACL.

2. The method as in claim 1, wherein each of the first access control, list and the second access control list is determined prior to the execution of the instance of the first business process and the third access control list is determined prior to the execution of the instance of the second business process.

3. The method as in claim 1, wherein:
the association defined for the first business process between the first ACL and the first business process object and the association defined for the first business process between the second ACL and the second business process object are defined during development of the first business process; and
the association defined for the second business process between the third ACL and the first business process object is defined during development of the second business process.

4. The method as in claim 1, wherein each of the first access control list, the second access control list, and third access control list indicates a type of access that a user, or a group of users is allowed.

5. The method as in claim 1, wherein the type of access that the specific application has to the first business process object specifies a permission or a restriction for the specific application.

6. The method as in claim 1, wherein at least one of the first access control list, the second access control list or the third access control list specifies that an accessing party be the specific application, a specific user, or a specific group of users.

7. The method as in claim 1, wherein at least one of the first access control list, the second access control list or the third access control list specifies that access is restricted if an accessing party is the specific application, a specific user, or a specific group of users.

8. The method as in claim 1, wherein at least one of the first access control list or the second access control list includes a permission for the specific application, the permission including one or more of the following: none, browse, read, relate, version, write, change location, change owner, change state, change permission, delete, execute, annotate, or approve.

9. The method as in claim 1, wherein at least one of the first access control list or the second access control list includes a restriction for the specific application, the restriction including one or more of the following: none, browse, read, relate, version, write, change location, change owner, change state, change permission, delete, execute, annotate, or approve.

10. A system for controlling access to business process data, comprising:
a processor; and
a memory coupled to the processor and storing instructions that are executable by the processor to:
configure a content management system ("CMS") to store:
a first business process, the first business process comprising a definition of a first plurality of steps, the first plurality of steps comprising steps for editing instances of a first business process object and instances of a second business process object created by instances of the first business process;
a second business process, the second business process including a definition of a second plurality of steps, the second plurality of steps comprising steps for editing instances of the first business process object and instances of a third business process object created by instances of the second business process;
an association defined for the first business process between a first access control list ("ACL") and the first business process object, the first ACL specifying a specific application and a type access that the specific application has to the first business process object;
an association defined for the first business process between a second ACL and the second business process object, the second ACL specifying the specific application and a type of access that the specific application has to the second business process object; and
an association defined for the second business process between a third ACL and the first business process object;

execute an instance of the first business process in the CMS;
create, by the instance of the first business process, a first instance of the first business process object and an instance of the second business process object, the first instance of the first business process object and the instance of the second business process object configured to contain business process data of the instance of the first business process;
associate, by the instance of first business process, the first instance of the first business process object with the first ACL based on the association defined for the first business process between the first ACL and the first business process object;
associate, by the instance of first business process, the instance of the second business process object with the second ACL based on the association defined for the first business process between the second ACL and the second business process object;
execute an instance of the second business process;
create, by the instance of the second business process, a second instance of the first business process object and an instance of the third business process object that are configured to contain business process data of the instance of the second business process;
associate, by the instance of the second business process, the second instance of the first business process object with the third ACL based on the association defined for the second business process between the third ACL and the first business process object;
store the first instance of the first business process object, the second instance of the first business process object, the instance of the second business process object and the instance of the third business process object in a CMS repository; and
use the CMS to control access to the first instance of the first business process object by the specific application in accordance with the first ACL, to control access to the second instance of the first business process object in accordance with the third ACL, and to control access to the instance of the second business process object by the specific application according to the second ACL.

11. The system of claim 10, wherein each of the first access control list and the second access control list is determined prior to the execution of the instance of the first business process and the third access control list is determined prior to the execution of the instance of the second business process.

12. The system of claim 10 wherein the instructions are further executable to:
create the association for the first business process between the first ACL and the first business process object and the association defined for the first business process between the second ACL and the second business process object during development of the first business process; and
create the association defined for the second business process between the third ACL and the first business process object during development of the second business process.

13. The system of claim 10, wherein each of the first access control list, the second access control list, and third access control list indicates a type of access that a user, or a group of users is allowed.

14. The system of claim 10, wherein the type of access that the specific application has to the first business process object specifies a permission or a restriction for the specific application.

15. The system of claim 10, wherein at least one of the first access control list, the second access control list or the third access control list specifies that an accessing party be the specific application, a specific user, or a specific group of users.

16. The system of claim 10, wherein at least one of the first access control list, the second access control list or the third access control list specifies that access is restricted if an accessing party is the specific application, a specific user, or a specific group of users.

17. The system of claim 10, wherein at least one of the first access control list, the second access control list or the third access control list includes a permission for the specific application, the permission including one or more of the following: none, browse, read, relate, version, write, change location, change owner, change state, change permission, delete, execute, annotate, or approve.

18. The system of claim 10, wherein at least one of the first access control list, the second access control list or the third access control list includes a restriction for the specific application, the restriction including one or more of the following: none, browse, read, relate, version, write, change location, change owner, change state, change permission, delete, execute, annotate, or approve.

19. A computer program product for controlling access to business process data, comprising:
a computer readable non-transitory medium storing instructions that are executable by a processor to:
configure a content management system ("CMS") to store:
a first business process, the first business process comprising a definition of a first plurality of steps, the first plurality of steps comprising steps for editing instances of a first business process object and instances of a second business process object created by instances of the first business process;
a second business process, the second business process including a definition of a second plurality of steps, the second plurality of steps comprising steps for editing instances of the first business process object and instances of a third business process object created by instances of the second business process;
an association defined for the first business process between a first access control list ("ACC) and the first business process object, the first ACL specifying a specific application and a type of access that the specific application has to the first business process object;
an association defined for the first business process between a second ACL and the second business process object, the second ACL specifying the specific application and the type of access that the specific application has to the second business process object; and
an association defined for the second business process between a third ACL and the first business process object;
execute an instance of the first business process in the CMS;
create, by the instance of the first business process, a first instance of the first business process object and an instance of the second business process object, the first instance of the first business process object and the instance of the second business process object configured to contain business process data of the instance of the first business process;

associate, by the instance of first business process, the first instance of the first business process object with the first ACL based on the association defined for the first business process between the first ACL and the first business process object;

associate, by the instance of first business process, the instance of the second business process object with the second ACL based on the association defined for the first business process between the second ACL and the second business process object;

execute an instance of the second business process;

create, by the instance of the second business process, a second instance of the first business process object and an instance of the third business process object that are configured to contain business process data of the instance of the second business process;

associate, by the instance of the second business process, the second instance of the first business process object with the third ACL based on the association defined for the second business process between the third ACL and the first business process object;

store the first instance of the first business process object, the second instance of the first business process object, the instance of the second business process object and the instance of the third business process object in a CMS repository; and use the CMS to control access to the first instance of the first business process object by the specific application in accordance with the first ACL, to control access to the second instance of the first business process object in accordance with the third ACL, and to control access to the instance of the second business process object by the specific application according to the second ACL.

20. The computer program product as in claim 19, wherein each of the first access control list and the second access control list is determined prior to execution of the instance of the first business process and the third access control list is determined prior to execution of the instance of the second business process.

* * * * *